…

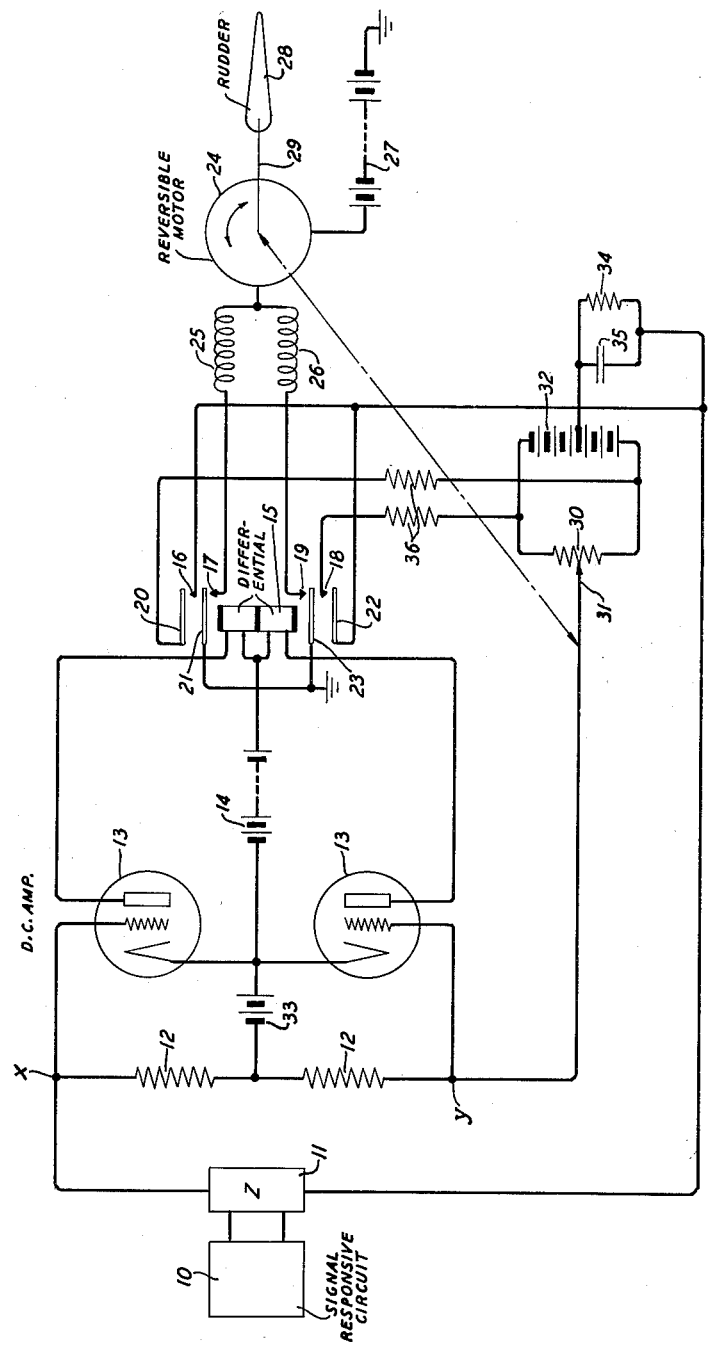

United States Patent Office 2,995,101
Patented Aug. 8, 1961

2,995,101
STEERING APPARATUS FOR TORPEDOES
Robert C. Jones, Summit, N.J., assignor to Bell Telephone Laboratories, Incorporated, New York, N.Y., a corporation of New York
Filed Nov. 20, 1944, Ser. No. 564,359
7 Claims. (Cl. 114—23)

This invention relates to control circuits and more particularly to amplifier-relay circuits for controlling the steering motors in signal responsive steering systems for moving bodies such as torpedoes.

In one form of steering system for sonically guided torpedoes, such as disclosed in the application Serial No. 491,794, filed June 22, 1943 of Donald D. Robertson, the vertical rudder and the horizontal rudder or elevator are actuated by reversible motors, one for each rudder, the direction of rotation of each motor, and hence the direction of deflection of the associated rudder, being determined by the condition of a respective control relay included in the output circuit of a direct current amplifier. The condition of the relay, in turn, is determined by the polarity of the resultant of several control potentials impressed upon the input circuit of the amplifier. The control potentials may include, for example, one derived from a target signal responsive system and related in polarity and amplitude to the angle between the target and the torpedo and another, in opposing relation to the first, obtained from a follow-up potentiometer.

In such steering systems, and especially in those wherein the elements, such as the amplifier and relay, of the rudder control equipment are highly sensitive, the rudder may oscillate at considerable amplitude about the position thereof corresponding to on-course orientation of the torpedo relative to the target whereby hunting and overshooting may occur.

One object of this invention is to improve control circuits for rudder actuating systems in signal controlled steering systems for moving bodies.

More specifically, one object of this invention is to substantially minimize oscillatory or hunting motion of the rudder in such steering systems.

In accordance with one feature of this invention, in a steering system of the general construction described hereinabove, means are provided in the rudder control circuit for establishing a substantially linear relationship between the motor torque and the difference between the actual instantaneous position of the rudder and the instantaneous position thereof as required by the control signals.

More specifically, in accordance with one feature of this invention, means are provided for introducing in the input circuit of the amplifier an auxiliary potential of polarity determined by the condition of the relay and varying in such manner that the relay aforementioned vibrates at a preassigned frequency and the difference in the fractions of time the armature means of the relay is at its extreme positions is proportional to the difference between the control potential obtained from the target signal responsive circuit and that due to the follow-up control whereby the motor torque decreases as the off-course angle of the torpedo decreases.

In one illustrative embodiment of this invention, the means aforenoted comprises a resistance-condenser combination included in the input circuit for the amplifier and connections under control of the relay for closing appropriate circuits to charge the condenser in one direction or the other depending upon the condition of the relay, whereby there is impressed upon the input circuit of the amplifier a potential effectively opposing that due to the target signal responsive system. The parameters of the resistance-condenser combination and the charging circuits therefor are so correlated that the frequency of vibration of the relay is considerably higher than the highest frequency of the control potential due to the target signal responsive circuit and materially lower than that for which the relay armature means would spend one half the time between its extreme positions and the other half at these positions.

The invention and the above noted and other features thereof will be understood more clearly and fully from the following detailed description with reference to the accompanying drawing which is a circuit diagram of a steering system for a torpedo illustrative of one embodiment of this invention.

In the drawing, 10 is a target signal responsive circuit, which may be of the construction disclosed in the application identified hereinabove, for producing across an impedance 11 a direct current potential related in polarity and proportional in amplitude to the angle of deviation of the torpedo from the on-course position relative to the target. The impedance 11 is connected in circuit with the input resistor 12 of a direct current amplifier comprising two similar electron discharge devices 13 in push-pull relation. The output circuit of each device 13 includes, in addition to the plate battery 14, a winding of a differential relay 15 having two pairs of contacts 16, 17 and 18, 19 with associated armatures 20, 21 and 22, 23, respectively.

The relay 15 by its operation determines the direction of rotation of a reversible, direct current motor 24 having a pair of field windings 25 and 26 each connected to a corresponding one of the contacts 17 or 19. The armatures 21 and 23 are connected to ground, as shown, and when either engages its associated contact, an obvious circuit is completed through the motor, one of the windings 25 or 26 and the power supply source 27, such as a battery, for the motor. The motor 24 is coupled to the rudder 28 by a suitable drive indicated at 29.

Included in the input circuit for the amplifier is a follow-up potentiometer comprising a resistor 30, the contact arm 31 of which is coupled to the motor 24, and a battery 32. Normally, that is when the rudder 28 is in the neutral position, the contact arm 31 is at the midpoint of the resistance 30 so that no potential is impressed upon the amplifier input circuit by the follow-up potentiometer. When the motor effects deflection of the rudder in one direction or the other, the contact arm 31 is moved from its center position in the direction such that the potential impressed upon the input circuit opposes that due to the control circuit.

In the absence of a target signal potential produced by the circuit 10 or when the torpedo is on course toward the target, the grids of the two discharge devices 13 are at the same potential, for example the bias potential provided by the battery 33, and the currents through the two windings of the relay 15 are equal and opposite. However, when the torpedo departs from the on-course position, a potential appears across the points x and y of the input circuit due to a potential established across the impedance 11, the latter potential, as noted heretofore, being of polarity and amplitude determined by the angle of deviation of the torpedo from the on-course position relative to the target. Hence, the currents through the two windings of the relay become unbalanced and one or the other armature 21 or 23 engages its associated contact 17 or 19 whereby the motor 24 is energized to deflect the rudder in the direction to bring the torpedo on course. Proportional control is introduced by the introduction of a potential by the follow-up potentiometer in the manner described hereinabove. Ideally, when the torpedo is thus returned to the on-course position, balance would be restored between the currents supplied to the relay windings and the rudder would remain in its central or neutral position. Practically however, due to, among other factors, the inertia of the motor and the sensitivity of the amplifier and the relay, an exact balance between the currents noted is not realized so that the rudder oscillates about its neutral position and the action known as hunting occurs.

In accordance with a feature of this invention, such oscillation of the rudder is minimized whereby overshooting is substantially prevented. For this purpose, a resistance condenser combination 34, 35 is connected in the input circuit for the amplifier. Specifically, one terminal of the condenser 35 is connected to the mid-point of the battery 32 and the other terminal thereof is connected to the relay armature 22 and contact 16 in common. The contact 18 and armature 20 are connected to opposite ends of the battery 32 by way of suitable equal resistances 36. When either armature 21 or 23 is actuated to engage its associated contact, the corresponding armature 20 or 22 also is actuated to close a charging circuit for the condenser 35 to one or the other pole of the battery 32.

As a result of closure of a charging circuit for the condenser 35, a potential increasing at a rate determined by the circuit constants and of polarity such as to oppose the potential across the impedance 11 is impressed upon the input circuit for the amplifier. Consequently, the potential difference between the points $x$ and $y$ decreases and at some instant after closure of the charging circuit, as aforenoted, the potential due to the charging of the condenser becomes greater than that due to the signal responsive circuit 10. Hence, the polarity of the potential between the points $x$ and $y$ reverses, the relay 15 is energized in the opposite direction, the previously closed charging circuit for the condenser is opened, and a circuit is closed for charging the condenser in the opposite direction. Thus, the potential impressed upon the amplifier input circuit due to the condenser falls from the value it had reached as a result of initial operation of the relay 15, so that the target signal control potential again becomes predominant and again the potential between the points $x$ and $y$ reverses in polarity.

The sequence of operations is repeated so that the potential between the points $x$ and $y$ reverses repeatedly and the relay 15 is controlled to close its contacts 17 and 19 in alternation at a frequency determined by the capacitance of the condenser 35 and the magnitudes of the resistors 34 and 36.

The frequency noted is made such, by correlation of the constants of the condenser 35 and resistances 34 and 36, that it is considerably greater than the highest frequency of reversal of the potential appearing across the impedance 11 and materially lower than that for which the armatures 21 and 23 would spend substantially one-half the time moving between the extreme positions thereof and the other half at these positions. Also the frequency is made such, for any particular motor that the motor will in effect integrate the pulses supplied thereto by the alternate closure of the motor energizing circuits over the contacts 17 and 19.

In a specific system wherein the highest frequency of reversal of the potential across the impedance 11 was of the order of one cycle per second and that for satisfying the conditions above set forth for the action of the armatures 21 and 23 was of the order of sixty cycles per second, a vibrating frequency for the relay of the order of twenty cycles per second is satisfactory.

When the relay 15 is caused to vibrate in the manner described above, the fraction of the time for which the armature 21 is in engagement with the contact 17 will be different from the fraction of the time for which the armature 23 will be in engagement with the contact 19. The relative magnitude of the two fractions of time for any period will be dependent upon the potential appearing between the points $x$ and $y$ in the input circuit of the amplifier and, thus, upon the difference between the potential appearing across the impedance 11 and the potential due to the follow-up control 30, 31, 32. Stated in another way, the difference between the fractions of the time noted is substantially proportional to the rudder correction required. As noted above, the motor, in effect, integrates the pulses supplied thereto by operation of the armatures 21 and 23 in alternation so that the average voltage supplied to the motor, and, consequently, the motor torque, is substantially linearly proportional to the difference between the actual and desired positions of the rudder, and as the torpedo is turned by the action of the rudder to bring is on course, the motor torque decreases as the rudder approaches the neutral position. Hence, in effect, the motor action is damped and the hunting amplitude of the rudder is substantially minimized.

Although a specific embodiment of the invention has been shown and described, it will be understood that it is but illustrative and that various modifications may be made therein without departing from the scope and spirit of this invention as defined in the appended claims.

What is claimed is:

1. A control circuit comprising an operating member, a reversible motor coupled to said operating member, an amplifier having an input circuit including an impedance, means for impressing a control potential upon said input circuit, means including a relay in the output circuit of said amplifier and operable in accordance with the polarity of the potential across said impedance for energizing said motor to effect rotation thereof in one direction or the other in accordance with said polarity, means for impressing upon said input circuit a second potential in opposition to said control potential and of magnitude proportional to the amplitude of displacement of said operating member by said motor, and means for damping said motor to reduce hunting thereof about the point corresponding to balance between said control and second potentials, said damping means comprising means controlled by said relay for impressing upon said input circuit a potential in opposition to said control potential, varying at a preassigned frequency and of sufficient maximum amplitude to overcome the maximum difference between said control and second potentials.

2. A control circuit in accordance with claim 1 wherein said damping means comprises a resistance and condenser in parallel and included in said input circuit, and means for charging said condenser in one direction or the other as determined by the condition of said relay.

3. A control circuit comprising an operating member, a reversible motor for actuating said member, an amplifier having an input circuit including an impedance and having an output circuit including a relay operable in accordance with the polarity of the potential across said impedance, means for impressing a control potential upon said input circuit, means controlled by said relay for energizing said motor to effect rotation of said motor in one direction or the other in accordance with the polarity of said control potential, means for impressing upon said input circuit a follow-up potential in opposition to said control potential and proportional in amplitude to displacement of said operating member, and auxiliary means for maintaining a substantially linear relation between the motor torque and the potential appearing across said impedance comprising means controlled by said relay for impressing upon said input circuit a potential in opposition to said control potential and of varying amplitude to effect repeated reversals of the polarity of the potential across said impedance.

4. A control circuit in accordance with claim 3 wherein said auxiliary means comprises a condenser and resistance in parallel in said input circuit and means for charging said condenser in one direction or the other in accordance with the condition of said relay.

5. A steering system for a moving body comprising a rudder, a reversible motor coupled to said rudder for deflecting it in opposite directions, an amplifier having an input circuit including an impedance and having an output circuit including a relay operable in accordance with the polarity of the potential appearing across said impedance, means for impressing upon said input circuit a control potential of polarity and amplitude at any time determined by the bearing of the body with respect to a target, energizing means for said motor controlled in accordance with the condition of said relay to effect deflection of said rudder in one direction or the other in accordance with the polarity of said control potential to steer the body toward on-course position relative to said target, and means for reducing hunting of said rudder about the on-course position thereof comprising auxiliary means controlled by said relay for effecting repeated reversal of the polarity of the potential appearing across said impedance in such manner that the difference in times said relay is in its two conditions is linearly proportional to the potential across said impedance due to said control potential.

6. A steering system for a moving body comprising a rudder, a reversible motor coupled to said rudder for deflecting it in opposite directions, an amplifier having an input circuit including an impedance and having an output circuit including a relay operable in accordance with the polarity of the potential appearing across said impedance, means for impressing upon said input circuit a control potential of polarity and amplitude at any time determined by the bearing of the body with respect to a target, energizing means for said motor controlled in accordance with the condition of said relay to effect deflection of said rudder in one direction or the other in accordance with the polarity of said control potential to steer the body toward on-course position relative to said target, and means for reducing hunting of said rudder about the on-course position thereof comprising a resistance and condenser connected in parallel in said input circuit, and charging circuits for said condenser controlled by said relay to charge said condenser in one direction or the other determined by the condition of said relay, the direction of initial charging of said condenser being such as to produce in said input circuit a potential in opposition to said control potential.

7. A steering system for a moving body comprising a rudder, a reversible motor for deflecting said rudder in one or the opposite direction, a direct current amplifier having an input circuit and having an output circuit including a relay, said relay having a pair of differentially operable contacts, energizing circuits for said motor each including a respective one of said contacts, said energizing circuits and contacts being associated so that the direction of energization of said motor is determined by the condition of said relay, said relay having also a second pair of differentially operable contacts, a condenser, a resistance in parallel with said condenser, a source, a pair of charging circuits for said condenser, each including said source and a respective one of said second pair of contacts and arranged so that when one of said second pair of contacts is closed said condenser is charged in one direction and when the other of said second pairs of contacts is closed said condenser is charged in the opposite direction, said input circuit comprising an impedance the polarity of the potential across which determines the condition of said relay, said condenser being included in said input circuit in series with said impedance, and means for impressing upon said input circuit a control potential of polarity and magnitude related to the bearing of the body with respect to a target, said charging circuits being poled so that the potential impressed upon said input circuit by said condenser opposes said control potential.

No references cited.